US006576583B1

(12) United States Patent
McDaniel et al.

(10) Patent No.: US 6,576,583 B1
(45) Date of Patent: *Jun. 10, 2003

(54) ORGANOMETAL CATALYST COMPOSITION

(75) Inventors: Max P. McDaniel, Bartlesville, OK (US); Marvin M. Johnson, Bartlesville, OK (US); Bruce B. Randolph, Bartlesville, OK (US); Kathy S. Collins, Bartlesville, OK (US); Elizabeth A. Benham, Bartlesville, OK (US); Michael D. Jensen, Bartlesville, OK (US); Joel L. Martin, Bartlesville, OK (US); Gil R. Hawley, Dewey, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,277

(22) Filed: Feb. 11, 2000

(51) Int. Cl.$^7$ .................. B01V 31/00; B01O 37/00; C08F 4/02; C08F 4/60
(52) U.S. Cl. ............ 502/104; 502/107; 502/113; 502/129; 502/227
(58) Field of Search .............. 502/113, 129, 502/227, 107, 104; 526/67, 160

(56) References Cited

U.S. PATENT DOCUMENTS

| | | | | |
|---|---|---|---|---|
| 4,100,337 A | * | 7/1978 | Noshay et al. ............ | 526/170 |
| 4,359,403 A | * | 11/1982 | Hoff et al. ............... | 526/129 |
| 4,424,139 A | * | 1/1984 | McDaniel et al. .......... | 502/128 |
| 5,064,796 A | * | 11/1991 | Speca .................... | 502/129 |
| 5,411,925 A | | 5/1995 | Geerts et al. ............. | 502/117 |
| 5,648,439 A | * | 7/1997 | Bergmeister et al. ....... | 502/113 |
| 5,712,365 A | | 1/1998 | Arai et al. ............... | 528/498 |
| 5,767,032 A | | 6/1998 | Hokkanen et al. .......... | 502/108 |
| 6,177,526 B1 | * | 1/2001 | Fritze ................... | 502/104 |
| 6,368,999 B1 | * | 4/2002 | Speca .................... | 502/104 |
| 6,391,816 B1 | * | 5/2002 | McDaniel et al. .......... | 502/128 |
| 6,395,666 B1 | * | 5/2002 | McDaniel et al. .......... | 502/104 |

FOREIGN PATENT DOCUMENTS

| | | | | |
|---|---|---|---|---|
| DE | 2 063 941 | * | 7/1971 | 502/129 |
| EP | 0 415 814 | * | 3/1991 | 502/227 |

OTHER PUBLICATIONS

US 2001/0051698 A1, U.S. pre–grant publication to Speca, Dec. 13, 2001, priority date to Aug. 26, 1998, class 502/104.*

* cited by examiner

Primary Examiner—Elizabeth Wood
Assistant Examiner—J. Pasterczyk
(74) Attorney, Agent, or Firm—Kilpatrick Stockton LLP

(57) ABSTRACT

This invention provides a process for producing a catalyst composition comprising contacting at least one group 4 metallocene, at least one organoaluminum compound, and at least one solid. The solid is selected from the group consisting of titanium tetrafluoride, zirconium tetrafluoride, and a treated solid oxide compound. The treated solid oxide compound comprises a solid oxide compound having titanium tetrafluoride or zirconium tetrafluoride deposited on the surface of the solid oxide compound. The solid oxide compound comprises oxygen and at least one element selected from the group consisting of groups 2–9 and 11–17 of the Periodic Table of Elements, including lanthanides and actinides. This invention also provides the catalyst composition produced by this process.

13 Claims, No Drawings

ORGANOMETAL CATALYST COMPOSITION

FIELD OF THE INVENTION

This invention is related to the field of organometal catalyst compositions.

BACKGROUND OF THE INVENTION

The production of polymers is a multi-billion dollar business. This business produces billions of pounds of polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro organic borate compounds have been used in place of large amounts of methyl aluminoxane. However, this is not satisfactory, since these borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

An object of this invention is to provide a process that produces a catalyst composition that can be used to polymerize at least one monomer to produce a polymer.

Another object of this invention is to provide the catalyst composition.

Another object of this invention is to provide a process comprising contacting at least one monomer and the catalyst composition under polymerization conditions to produce the polymer.

These objects, and other objects, will become more apparent to those with ordinary skill in the art after reading this disclosure.

SUMMARY OF THE INVENTION

In accordance with one embodiment of this invention, a process to produce a catalyst composition is provided. The process comprises (or optionally, "consists essentially of," or "consists of") contacting at least one organometal compound, at least one organoaluminum compound, and at least one solid to produce the catalyst composition, wherein the organometal compound has the following general formula:

$$(X^1)(X^2)(X^3)(X^4)M^1$$

wherein $M^1$ is selected from the group consisting of titanium, zirconium, and hafnium;

wherein ($X^1$) is independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of ($X^1$) are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on ($X^1$) can be a bridging group which connects ($X^1$) and ($X^2$);

wherein ($X^3$) and ($X^4$) are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein ($X^2$) is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on ($X^2$) are selected from the group consisting of aliphatic groups, cyclic groups, combinations of aliphatic groups and cyclic groups, silyl groups, alkyl halide groups, halides, organometallic groups, phosphorus groups, nitrogen groups, silicon, phosphorus, boron, germanium, and hydrogen;

wherein at least one substituent on ($X^2$) can be a bridging group which connects ($X^1$) and ($X^2$);

wherein the organoaluminum compound has the following general formula:

$$Al(X^5)_n(X^6)_{3-n}$$

wherein ($X^5$) is a hydrocarbyl having from 1–20 carbon atoms;

wherein ($X^6$) is a halide, hydride, or alkoxide;

wherein the solid is selected from the group consisting of titanium tetrafluoride, zirconium tetrafluoride, and a treated solid oxide compound;

wherein the treated solid oxide compound comprises a solid oxide compound having titanium tetrafluoride or zirconium tetrafluoride deposited on the surface of the solid oxide compound; and wherein the solid oxide comprises oxygen and at least one element selected from the group consisting of groups 2–9 and 11–17 of the Periodic Table of Elements, including lanthanides and actinides.

In accordance with another embodiment of this invention, a process is provided comprising contacting at least one monomer and the catalyst composition under polymerization conditions to produce a polymer.

In accordance with another embodiment of this invention, an article is provided. The article comprises the polymer produced in accordance with this invention.

DETAILED DESCRIPTION OF THE INVENTION

A process to produce a catalyst composition is provided. The process comprises contacting at least one organometal compound, at least one organoaluminum compound, and at least one solid.

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ is independently selected from the group consisting of (hereafter "Group OMC-I") cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not to substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

In this formula, $(X^3)$ and $(X^4)$ are independently selected from the group consisting of (hereafter "Group OMC-II") halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 1 0 carbon atoms. However, it is most preferred when $(X^3)$ and $(X^4)$ are selected from the group consisting of fluoro, chloro, and methyl.

In this formula, $(X^2)$ can be selected from either Group OMC-I or Group OMC-II.

At least one substituent on $(X^1)$ or $(X^2)$ can be a bridging group that connects $(X^1)$ and $(X^2)$, as long as the bridging group does not substantially, and adversely, affect the activity of the catalyst composition. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium.

Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

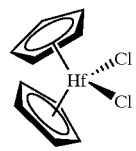

bis(cyclopentadienyl)hafnium dichloride;

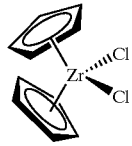

bis(cyclopentadienyl)zirconium dichloride;

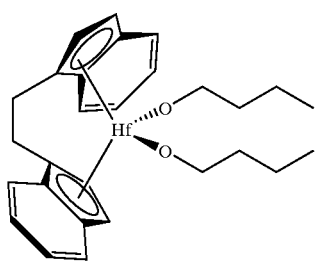

1,2-ethanediylbis($\eta^5$-1-indenyl)di-*n*-butoxyhafnium;

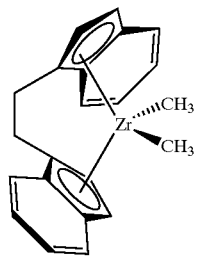

1,2-ethanediylbis($\eta^5$-1-indenyl)dimethylzirconium;

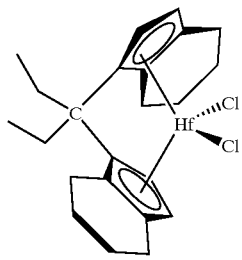

3,3-pentanediylbis($\eta^5$-4,5,6,7-tetrahydro-1-indenyl)hafnium dichloride;

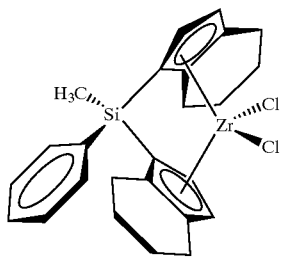

methylphenylsilylbis($\eta^5$-4,5,6,7-tetrahydro-1-indenyl)zirconium dichloride;

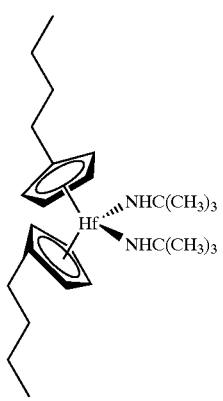

bis(*n*-butylcyclopentadienyl)bis(di-*t*-butylamido)hafnium;

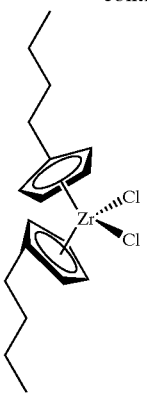

bis(*n*-butylcyclopentadienyl)zirconium dichloride;

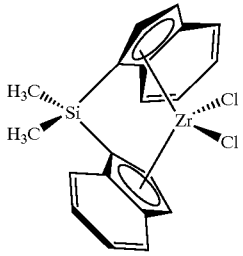

dimethylsilylbis(1-indenyl)zirconium dichloride;

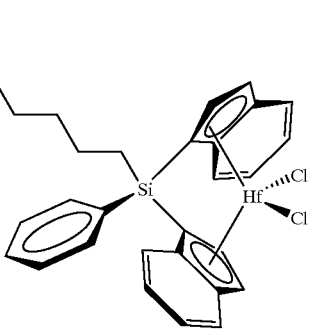

octylphenylsilylbis(1-indenyl)hafnium dichloride;

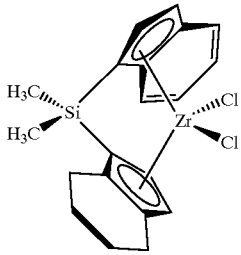

dimethylsilylbis($\eta^5$-4,5,6,7-tetrahydro-1-indenyl)zirconium dichloride;

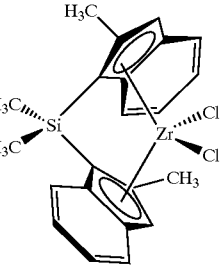

dimethylsilylbis(2-methyl-1-indenyl)zirconium dichloride;

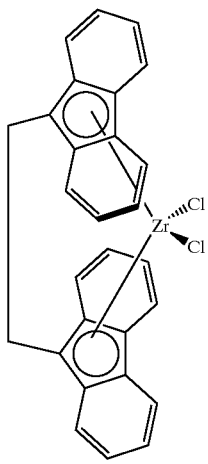

1,2-ethanediylbis(9-fluorenyl)zirconium dichloride;

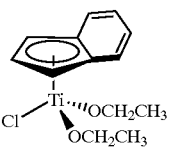

indenyl diethoxy titanium(IV) chloride;

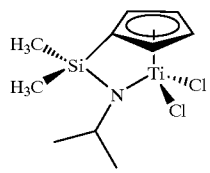

(isopropylamidodimethylsilyl)cyclopentadienyltitanium dichloride;

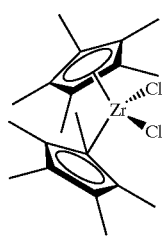

bis(pentamethylcyclopentadienyl)zirconium dichloride;

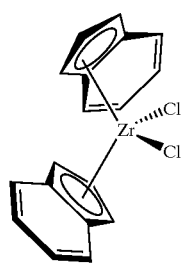

bis(indenyl) zirconium dichloride;

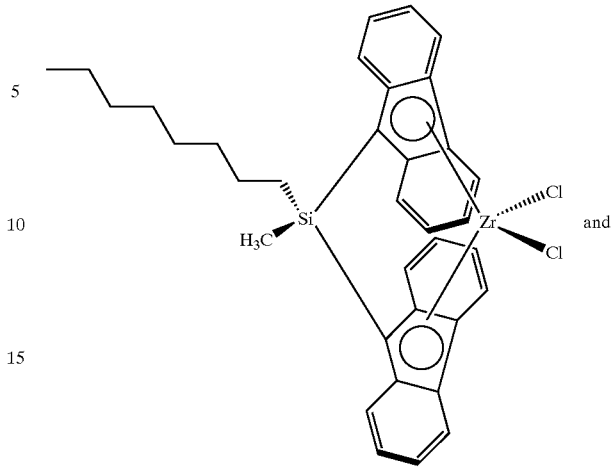

methyloctylsilyl bis (9-fluorenyl) zironium dichloride;

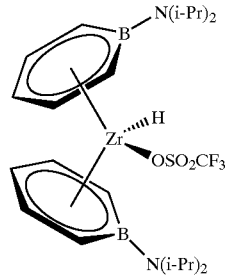

bis-[1-(N,N-diisopropylamino)boratabenzene]hydriozirconium trifluoromethysulfonate Preferably, the organometal compound is selected from the group consisting of

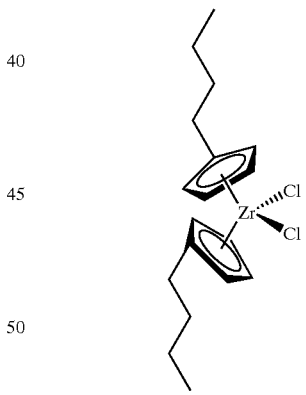

bis(n-butylcyclopentadienyl)zirconium dichloride;

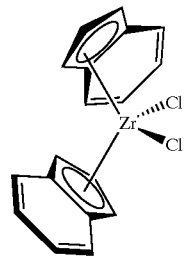

bis(indenyl)zirconium dichloride;

-continued

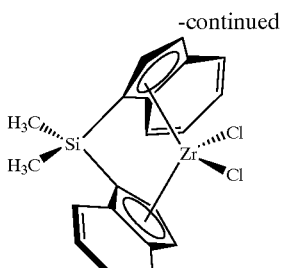

dimethylsilylbis(1-indenyl) zirconium dichloride;

and

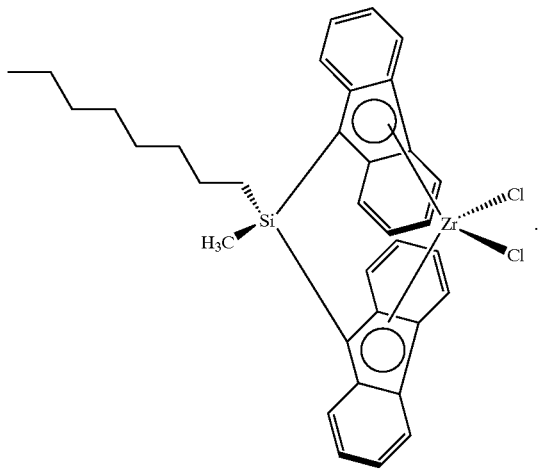

methyloctylsilylbis(9-fluorenyl)zirconium dichoride

Organoaluminum compounds have the following general formula:

$$Al(X^5)_n(X^6)_{3-n}$$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ is a halide, hydride, or alkoxide. Currently, it is preferred when $(X^6)$ is independently selected from the group consisting of fluoro and chloro. However, it is most preferred when $(X^6)$ is chloro.

In this formula, "n" is a number from 1 to 3 inclusive. However, it is preferred when "n" is 3.

Examples of such compounds are as follows:

trimethylaluminum;
triethylaluminum (TEA);
tripropylaluminum;
diethylaluminum ethoxide;
tributylaluminum;
diusobutylaluminum hydride;
triisobutylaluminum hydride;
triisobutylaluminum; and
diethylaluminum chloride.

Currently, TEA is preferred.

The treated solid oxide compound comprises a solid oxide compound having titanium tetrafluoride or zirconium tetrafluoride deposited on the surface of the solid oxide compound. Generally, any high surface area, high porosity, solid oxide compound can be used. The solid oxide compound comprises oxygen and at least one element selected from the group consisting of groups 2–9 and 11–17 of the Periodic Table of Elements, including lanthanides and actinides. However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn, and Zr. Preferably, the solid oxide compound is selected from the group consisting of alumina, silica, silica-alumina, aluminophosphate, aluminoborate, silica-zironia, silica-titania, thoria, and mixtures thereof. The solid oxide compound can be produced by any method known in the art, such as, for example, by gelling, co-gelling, impregnation of one compound onto another, and flame hydrolysis.

Generally, the specific surface area of the solid oxide compound is from about 100 to about 1000 m$^2$/g, preferably, from about 200 to about 800 m$^2$/g, and most preferably, from 250 to 600 m$^2$/g after calcining at 500° C.

The specific pore volume of the solid oxide compound is typically greater than about 0.5 cm$^3$/g, preferably, greater than about 0.8 cm$^3$/g, and most preferably, greater than 1.0 cm$^3$/g.

Calcining is conducted at various steps in the production of the treated solid oxide compound. Generally, calcining of the solid oxide compound is conducted at a temperature in the range of about 200° C. to about 900° C., preferably in a range of about 300° to about 700° C., and most preferably in a range of 350° C. to 600° C. Typically, calcining is conducted for about 1 minute to about 100 hours, preferably for about 1 hour to about 50 hours, and most preferably, for 3 hours to 20 hours. Calcining is performed typically in an inert atmosphere. Alternatively, an oxidizing atmosphere, such as, for example, oxygen or air, or a reducing atmosphere, such as, for example, hydrogen or carbon monoxide, can be utilized.

When the treated solid oxide compound is utilized to produce the catalyst composition, the TiF$_4$ or ZrF$_4$ can be deposited on the solid oxide compound by any means known in the art. Generally, the TiF$_4$ or ZrF$_4$ can be deposited on the solid oxide compound by a process of impregnation, sublimation, or decomposition of a salt. For best results, the solid oxide compound contains between about 0.01 and about 10 millimoles of TiF$_4$ or ZrF$_4$ per gram of solid oxide compound before calcining or contained on a precalcined solid oxide compound, preferably between about 0.1 and about 5 millimoles, and most preferably between 0.5 and 3.0 millimoles.

When an impregnation process is utilized, the process comprises first calcining the solid oxide compound to remove moisture to produce a calcined solid oxide compound. Calcining was discussed previously in this disclosure. Secondly, TiF$_4$ or ZrF$_4$ is dissolved in any aprotic polar solvent, such as, for example, acetonitrile, carbon tetrachloride, dimethyl sulfoxide, ethylene glycol alkoxides, glymes, and mixtures thereof, to produce a metal fluoride solution. The metal fluoride solution then is contacted with the calcined solid oxide compound to produce a metal fluoride/solid oxide compound mixture. Then, the aprotic polar solvent is evaporated from the metal fluoride/solid oxide compound mixture leaving the TiF$_4$ or ZrF$_4$ deposited on the solid oxide compound, thereby, producing the treated solid oxide compound. Optionally, for best results, the treated solid oxide compound can be dried thoroughly, even calcined up to a temperature in a range of about 300° C. to about 500° C., to remove traces of the aprotic polar solvent.

When a sublimation process is utilized to produce the treated solid oxide compound, the process comprises depositing TiF$_4$ onto the solid oxide compound by gas phase deposition. ZrF$_4$ cannot be deposited by sublimation onto the solid oxide compound. In this process, TiF$_4$, which sublimes at about 284° C. at ambient pressure, is evaporated in the presence of the solid oxide compound and then condensed onto the solid oxide compound either through adsorption, or in some cases, through reaction with the solid oxide compound. Typically, the solid oxide compound is calcined to produce a calcined solid oxide compound. The calcined solid oxide compound is dry mixed with $TiF_4$ to produce a $TiF_4$/solid oxide compound mixture. The calcining of the solid oxide compound is conducted as discussed previously in this disclosure. This $TiF_4$/solid oxide compound mixture then is calcined at a temperature in a range of about 250° C. to about 600° C., preferably 300° C. to 500° C. Generally, calcining time is in the range of about 1 minute to about 10 hours, preferably, 1 hour to 5 hours.

The process of depositing $TiF_4$ or $ZrF_4$ by decomposition of a salt comprises impregnating the solid oxide compound with a solution comprising ammonium hexafluorotitanate (($NH_4)_2TiF_6$) or ammonium hexafluorozirconate (($NH_4)_2ZrF_6$) and a solvent to produce an ammonium metal fluoride-containing solid oxide compound. The solvent is evaporated, and the ammonium metal fluoride-containing solid oxide compound is calcined at sufficiently high temperature to decompose the ammonium salt to $TiF_4$ or $ZrF_4$, thereby, releasing ammonium fluoride ($NH_4F$) in the process to produce the treated solid oxide compound. In this embodiment, the solid oxide compound can be virgin or previously calcined as discussed previously in this disclosure. The solvent can be water or a polar organic solvent, such as, for example alcohol or acetone. The calcining of the ammonium metal fluoride-containing solid oxide compound is in a range of about 250° C. to 600° C., preferably 300° C. to 550° C. and over a time of one minute to 10 hours, preferably one to five hours.

The catalyst compositions of this invention can be produced by contacting the organometal compound, the organoaluminum compound, and the solid, together. This contacting can occur in a variety of ways, such as, for example, blending. Furthermore, each of these compounds can be fed into a reactor separately, or various combinations of these compounds can be contacted together before being further contacted in the reactor, or all three compounds can be contacted together before being introduced into the reactor.

Currently, one method is to first contact the organometal compound and the solid together, for about 1 minute to about 24 hours, preferably, 1 minute to 1 hour, at a temperature from about 10° C. to about 200° C., preferably 15° C. to 80° C., to form a first mixture, and then contact this first mixture with an organoaluminum compound to form the catalyst composition.

Another method is to precontact the organometal compound, the organoaluminum compound, and the solid before injection into a polymerization reactor for about 1 minute to about 24 hours, preferably, 1 minute to 1 hour, at a temperature from about 10° C. to about 200° C., preferably 20° C. to 80° C.

A weight ratio of the organoaluminum compound to the solid in the catalyst composition ranges from about 5:1 to about 1:1000, preferably, from about 3:1 to about 1:100, and most preferably, from 1:1 to 1:50.

A weight ratio of the solid to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

After contacting, the catalyst composition comprises a post-contacted organometal compound, a post-contacted organoaluminum compound, and a post-contacted solid. Preferably, the post-contacted solid is the majority, by weight, of the catalyst composition. Often times, specific components of a catalyst are not known, therefore, for this invention, the catalyst composition is described as comprising post-contacted compounds.

A weight ratio of the post-contacted organoaluminum compound to the post-contacted solid in the catalyst composition ranges from about 5:1 to about 1:1000, preferably, from about 3:1 to about 1:100, and most preferably, from 1:1 to 1:50.

A weight ratio of the post-contacted treated solid to the post-contacted organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

The activity of the catalyst composition of this invention is greater than about 50 grams of polymer per gram of solid per hour, more preferably greater than about 75, and most preferably greater than 100. This activity is measured under slurry polymerization conditions, using isobutane as the diluent, and with a polymerization temperature of 90° C., and an ethylene pressure of 550 psig. The reactor should have substantially no indication of any wall scale, coating or other forms of fouling.

One of the important aspects of this invention is that no aluminoxane needs to be used in order to form the catalyst composition. Aluminoxane is an expensive compound that greatly increases polymer production costs. This also means that no water is needed to help form such aluminoxanes. This is beneficial because water can sometimes kill a polymerization process. Additionally, it should be noted that no fluoro organic borate compounds need to be used in order to form the catalyst composition. In summary, this means that the catalyst composition, which is heterogenous, and which can be used for polymerizing monomers, can be easily and inexpensively produced because of the substantial absence of any aluminoxane compounds or fluoro organic borate compounds. It should be noted that organochromium compounds and $MgCl_2$ are not needed in order to form the catalyst composition. Although aluminoxane, fluoro organic borate compounds, organochromium compounds, or $MgCl_2$ are not needed in the preferred embodiments, these compounds can be used in other embodiments of this invention.

In another embodiment of this invention, a process comprising contacting at least one monomer and the catalyst composition to produce a polymer is provided. The term "polymer" as used in this disclosure includes homopolymers and copolymers. The catalyst composition can be used to polymerize at least one monomer to produce a homopolymer or a copolymer. Usually, homopolymers are comprised of monomer residues, having 2 to about 20 carbon atoms per molecule, preferably 2 to about 10 carbon atoms per molecule. Currently, it is preferred when at least one monomer is selected from the group consisting of ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof.

When a homopolymer is desired, it is most preferred to polymerize ethylene or propylene. When a copolymer is desired, the copolymer comprises monomer residues and one or more comonomer residues, each having from about 2 to about 20 carbon atoms per molecule. Suitable comonomers include, but are not limited to, aliphatic 1-olefins having from 3 to 20 carbon atoms per molecule, such as, for example, propylene, 1-butene, 1-pentene, 4-methyl-1-pentene, 1-hexene, 1-octene, and other olefins and conjugated or nonconjugated diolefins such as 1,3-butadiene, isoprene, piperylene, 2,3-dimethyl-1,3-butadiene, 1,4-pentadiene, 1,7-hexadiene, and other such diolefins and mixtures thereof. When a copolymer is desired, it is preferred to polymerize ethylene and at least one comonomer selected from the group consisting of 1-butene, 1-pentene, 1-hexene, 1-octene, and 1-decene. The amount of comonomer introduced into a reactor zone to produce a copolymer is generally from about 0.01 to about 10 weight percent comonomer based on the total weight of the monomer and comonomer, preferably, about 0.01 to about 5, and most preferably, 0.1 to 4. Alternatively, an amount sufficient to give the above described concentrations, by weight, in the copolymer produced can be used.

Processes that can polymerize at least one monomer to produce a polymer are known in the art, such as, for example, slurry polymerization, gas phase polymerization, and solution polymerization. It is preferred to perform a slurry polymerization in a loop reaction zone. Suitable diluents used in slurry polymerization are well known in the art and include hydrocarbons which are liquid under reaction conditions. The term "diluent" as used in this disclosure does not necessarily mean an inert material; it is possible that a diluent can contribute to polymerization. Suitable hydrocarbons include, but are not limited to, cyclohexane, isobutane, n-butane, propane, n-pentane, isopentane, neopentane, and n-hexane. Furthermore, it is most preferred to use isobutane as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

The catalyst compositions used in this process produce good quality polymer particles without substantially fouling the reactor. When the catalyst composition is to be used in a loop reactor zone under slurry polymerization conditions, it is preferred when the particle size of the solid oxide compound is in the range of about 10 to about 1000 micrometers, preferably about 25 to about 500 micrometers, and most preferably, 50 to 200 micrometers, for best control during polymerization.

In a more specific embodiment of this invention, a process is provided to produce a catalyst composition, the process comprising (optionally, "consisting essentially of", or "consisting of"):

(1) calcining silica-alumina at a temperature in a range of about 300 to about 500° C. for about 3 hours to produce a calcined silica-alumina;

(2) cooling the calcined silica-alumina and mixing 5 to 20% by weight of titanium tetrafluoride based on the weight of the calcined silica-alumina to produce a titanium tetrafluoride-containing silica-alumina; and (3) calcining the titanium tetrafluoride-containing silica-alumina at a temperature in a range of about 300 to about 500° C. for about 1 hour to produce a treated solid oxide compound; and (4) contacting an organometal compound, an organoaluminum compound, and the treated solid oxide compound to produce the catalyst composition.

Hydrogen can be used with this invention in a polymerization process to control polymer molecular weight.

One of the features of this invention is that the $TiF_4$, $ZrF_4$, or treated solid oxide compound is itself an active catalyst for polymerization without the organometal compound, and it tends to produce very high molecular weight polymer relative to polymer produced by an organometal compound. Thus, when the $TiF_4$, $ZrF_4$, or the treated solid oxide compound is utilized with an organometal compound, it tends to produce bimodal polymers.

After the polymers are produced, they can be formed into various articles, such as, for example, household containers and utensils, film products, drums, fuel tanks, pipes, geomembranes, and liners. Various processes can form these articles. Usually, additives and modifiers are added to the polymer in order to provide desired effects. It is believed that by using the invention described herein, articles can be produced at a lower cost, while maintaining most, if not all, of the unique properties of polymers produced with metallocene catalysts.

EXAMPLES

Test Methods

A "Quantachrome Autosorb-6 Nitrogen Pore Size Distribution Instrument" was used to determined the specific surface area ("surface area") and specific pore volume ("pore volume") of the solid oxide compounds. This instrument was acquired from the Quantachrome Corporation, Syosset, N.Y.

Melt Index (MI) in grams of polymer per ten minutes was determined in accordance with ASTM D1238, condition 190/2, at 190° C. with a 2,160 gram weight.

High load melt index (HLMI, g/10 min) was determined in accordance with ASTM D1238, Condition 190/2.16, at 190° C. with a 21,600 gram weight.

Molecular weights and molecular weight distributions were obtained using a Waters 150 CV gel permeation chromatograph with trichlorobenzene (TCB) as the solvent, with a flow rate of 1 milliliter/minute at a temperature of 140° C. BHT (2,6-di-tert-butyl-4-methylphenol) at a concentration of 1.0 gram/liter was used as a stabilizer in the TCB. An injection volume of 220 microliters was used with a nominal polymer concentration of 0.3 gram/liter (at room temperature). Dissolution of the sample in stabilized TCB was carried out by heating at 160–170° C. for 20 hours with occasional, gentle agitation. The column was two Waters HT-6E columns (7.8 mm×300 mm). The columns were calibrated with a broad linear polyethylene standard (Phillips Marlex® BHB 5003) for which the molecular weight had been determined.

Solid Oxide Compounds

Silica was obtained from W. R. Grace, grade 952, having a pore volume of about 1.6 cc/g and a surface area of about 300 m²/g.

Alumina sold as Ketjen grade B alumina was obtained from Akzo Nobel Chemical having a pore volume of about 1.78 cc/g and a surface area of about 350 m²/g.

Silica-alumina was obtained from W. R. Grace as MS 13-110 containing 13% by weight alumina and 87% by weight silica. The silica-alumina had a pore volume of about 1.2 cc/g and a surface area of about 450 m²/g.

Calcining

To calcine the solid oxide compound, about 10 grams were placed in a 1.75 inch quartz tube fitted with a sintered quartz disk at the bottom. While the solid oxide compound was supported on the disk, air or nitrogen that had been dried by passing through a 13× molecular sieve column was blown up through the disk at a rate of about 1.6 to about 1.8 standard cubic feet per hour. An electric furnace around the quartz tube was then turned on, and the temperature was raised at the rate of 400° C. per hour to the indicated temperature, typically 600° C. At that temperature, the solid oxide compound was allowed to fluidize for three hours in the dry air. Afterward, the solid oxide compound was collected and stored under dry nitrogen, where it was protected from the atmosphere until ready for testing. It was never allowed to experience any exposure to the atmosphere.

Polymerization Procedure

Polymerization runs were made in a 2.2 liter steel reactor equipped with a marine stirrer running at 400 revolutions per minute (rpm). The reactor was surrounded by a steel jacket containing boiling methanol with a connection to a steel condenser. The boiling point of the methanol was controlled by varying nitrogen pressure applied to the condenser and jacket, which permitted precise temperature control to within half a degree celsius, with the help of electronic control instruments.

Unless otherwise stated, a small amount (0.01 to 0.10 grams normally) of a test compound ($TiF_4$, a solid oxide compound, or a treated solid oxide compound) was first charged under nitrogen to the dry reactor. Next, 2.0 milliliters of a toluene solution containing 0.5 percent by weight of bis(n-butylcyclopentadienyl) zirconium dichloride was added, followed by 0.6 liter of isobutane liquid. Then, 1.0 milliliter of a 1.0 molar solution of triethyl aluminum in heptane (TEA) was added, followed by another 0.6 liter of isobutane liquid. Then, the reactor was heated up to the specified temperature, typically 90° C., and finally ethylene was added to the reactor to equal a fixed pressure, generally 550 psig to produce a reaction mixture. The reaction mixture was allowed to stir for usually around one hour. As ethylene was consumed, more ethylene flowed in to maintain the pressure. The activity was noted by recording the flow of ethylene into the reactor to maintain the set pressure.

After the allotted time, the ethylene flow was stopped, and the reactor slowly depressurized and opened to recover a granular polymer. In all cases, the reactor was clean with no indication of any wall scale, coating or other forms of fouling The polymer then was removed and weighed. Activity was specified as grams of polymer produced per gram of test compound charged per hour.

Description of Results

Specific examples of this invention are described subsequently. The results of these polymerization tests are listed in Tables 1 and 2.

Inventive Example 1

Titanium Tetrafluoride

In example 1, 0.1397 gram of anhydrous $TiF_4$ obtained from Aldrich Chemical Company was charged to the reactor under nitrogen. Then, 2 milliliters of bis(n-butylcyclopentadienyl) zirconium dichloride solution in heptane (0.5 wt %) was added to the reactor followed by 1 milliliter of 1 molar triethylaluminum solution in heptane. One liter of isobutane diluent was added. The temperature was heated up to 90° C., and ethylene was supplied on demand at 550 psig for 110 minutes. Afterward the reactor was depressurized, opened, and 16 grams of white polymer powder were recovered which yielded an activity of 62 grams of polymer per gram of $TiF_4$ per hour.

The polymer was found to have a melt index and a high load melt index of zero. The weight average molecular weight (Mw) of the polymer was found to be very high at 2,866,000 g/mol. The number average molecular weight (Mn) was found to be 243,000, and the polydispersity (Mw/Mn) was found to be very broad at 15.9. The molecular weight distribution was distinctly bimodal, probably due to the two different active components in the catalyst composition, the organometal compound and $TiF_4$.

Control Example 2

No Titanium Tetrafluoride

In example 2, the same procedure as in example 1 was repeated except that the $TiF_4$ was omitted. No polymer was produced.

Inventive Example 3

Sublimation of $TiF_4$ onto Silica

In example 3, 10 grams of silica described previously were calcined in dry nitrogen at 400° C. for three hours to remove moisture to produce a calcined silica. Then, the calcined silica was cooled to room temperature and physically mixed, by vigorous stirring in the dry state, with 0.10 gram of $TiF_4$ to produce a $TiF_4$/solid oxide compound mixture. This $TiF_4$/solid oxide compound mixture was then calcined again under nitrogen at 400° C. for another hour to redistribute the titanium tetrafluoride through sublimation to produce a treated solid oxide compound. Then, 0.2531 gram of the treated solid oxide compound was charged to the reactor along with the organometal compound and the triethylaluminum solution as in example 1. In 91.5 minutes of polymerization, it produced 14 grams of polymer powder.

Control Example 4

Silica

In example 4, the same silica used in example 3, calcined at 600° C., was charged to the reactor along with the organometal compound and triethylaluminum. It produced essentially no polymer.

Inventive Examples 5–6

Impregnation of $TiF_4$ onto Alumina

In example 5, 1.64 grams of $TiF_4$ were dissolved in 50 milliliters of dry acetonitrile ($CH_3CN$) to produce a metal fluoride solution. This metal fluoride solution was then impregnated onto 9.6 grams of the alumina described previously, which had been calcined in dry nitrogen at 600° C. for three hours. The metal fluoride solution was evaporated to dryness under flowing dry nitrogen with gentle warming to produce a dry powder. Then, the dry powder was dried further under flowing nitrogen at 200° C. for one hour to produce a treated solid oxide compound. When tested for polymerization activity with the organometal compound and triethylaluminum as in the polymerization procedure discussed previously, the treated solid oxide compound produced 78 grams of polymer per gram of treated solid oxide compound per hour.

In Example 6, the treated solid oxide compound of Example 5 was further dried at 300° C. for one hour to help further distribute the $TiF_4$. When tested for polymerization activity, it yielded an activity of 68 grams of polymer per gram of treated solid oxide compound per hour.

Control Examples 7–9

Alumina

In examples 7–9, only the alumina, devoid of $TiF_4$, was charged to the reactor with the organometal compound and triethylaluminum. The alumina had been calcined at 400° C., 600° C., and 800° C. respectively, but as can be seen in Table 1, activities derived from the alumina without $TiF_4$ were slight to none.

Inventive Examples 10–16

Decomposition of Ammonium Hexafluorotitanate onto Silica

In example 10, silica was impregnated with an aqueous solution of ammonium hexafluorotitanate, $(NH_4)_2TiF_6$, to incipient wetness to produce an ammonium titanium fluoride-containing silica. That is, each 10 grams of silica received 20 grams of an aqueous solution containing 5 millimoles of $(NH_4)_2TiF_6$. The ammonium titanium fluoride-containing silica was then dried in a vacuum oven overnight at 100° C. A ten gram sample of the ammonium titanium fluoride-containing silica was then calcined under flowing dry nitrogen at 250° C. for three hours to evaporate ammonia to produce a treated solid oxide compound. When tested following the polymerization procedure used in Example 1, an activity of 156 grams of polymer per gram of treated solid oxide compound per hour was observed.

In examples 11 and 12, the treated solid oxide compound of Example 10 was calcined further under flowing nitrogen for three hours at 350° C. and 400° C. respectively. Polymerization activity was found to be 79 and 155 grams of polymer per gram of treated solid oxide compound per hour, respectively.

In example 13, the same procedure of example 10 was repeated, except that 2.0 millimoles of ammonium hexafluorotitanate per gram of silica were impregnated onto the silica to produce a treated solid oxide compound. After calcining at 250° C., it yielded an activity of 107 grams of polymer per gram of treated solid oxide compound per hour. In examples 14, 15, and 16, the treated solid oxide compound was calcined at higher temperatures, 350° C., 450° C., and 550° C. respectively, yielding activities of 5, 94, and 140 grams of polymer per gram of treated solid oxide compound per hour.

Inventive Examples 17–23

Decomposition of Ammonium Hexafluorozirconate onto Silica

In example 17, the same procedure of example 10 was repeated, except that ammonium hexafluorozirconate $((NH_4)_2ZrF_6)$ was used instead of ammonium hexafluorotitanate to produce an ammonium zirconium fluoride-containing silica. 0.4 millimole of $(NH_4)_2ZrF_6$ was impregnated per gram of silica. The ammonium zirconium fluoride-containing silica then was calcined in dry nitrogen at 250° C. for one hour to produce a treated solid oxide compound. The treated solid oxide compound was tested for polymerization activity and yielded 666 grams of polymer per gram of treated solid oxide compound per hour. In examples 18 and 19, the treated solid oxide compound was calcined at 350° C. and 400° C. Activities of 168 and 77 grams of polymer per gram of treated solid oxide compound were obtained respectively.

In example 20, the amount of ammonium hexafluorozirconate was increased to 1.9 millimoles impregnated per gram of silica. After being calcined at 250° C. for one hour, the treated solid oxide compound yielded an activity of 236 grams of polymer per gram of treated solid oxide compound per hour. In examples 21, 22, and 23, the treated solid oxide compound in example 20 was calcined at 350° C., 450° C., and 550° C., and activities of 105, 217, and 193 grams of polymer per gram of treated solid oxide compound per hour respectively were observed.

Inventive Examples 24–25 and Control Example 26

Sublimation of $TiF_4$ onto Silica-Alumina

In example 24, the sublimation procedure of example 3 was repeated except that a silica-alumina was used instead of silica. The silica-alumina had been previously calcined in dry nitrogen for three hours at 500° C. to remove moisture to produce a calcined silica-alumina. The calcined silica-alumina was then cooled and dry mixed with 11% of its own weight of titanium tetrafluoride and calcined again at 500° C. for one hour to produce a treated solid oxide compound. When tested for polymerization activity per the polymerization procedure discussed previously, the treated solid oxide compound material yielded an activity of 8148 grams of polymer per gram of a treated solid oxide compound per hour. In example 25, the treated solid oxide compound was tested again and yielded an activity of 8202 grams of polymer per gram of treated solid oxide compound per hour. These results are shown in Table 2.

The polymer of Example 24 was found to have a melt index of 0.116 grams/10 minutes and a high load melt index of 2.80 grams/10 minutes giving a shear ratio (HLMI/MI) of 24.2. This is considerably broader (higher) than usually obtained from polymer produced by this organometal compound when activated by other compounds, such as MAO, which generally yields a shear ratio of 16. The higher shear ratio is probably the result of a contribution to the activity from two sources of polymerization sites. The main contribution comes from the organometal compound, but another, higher molecular weight source of activity comes from the $TiF_4$ itself. To demonstrate this, the treated solid oxide compound was tested again in example 26 except that the organometal compound was omitted. The treated solid oxide compound still yielded an activity of 67 grams of polymer per gram of treated solid oxide compound, indicating an inherent activity of its own. The polymer produced by the treated solid oxide compound was found to have zero melt index and zero high load melt index.

Control Examples 27 and 28

Silica-Alumina

In Examples 27 and 28, the procedure of Example 24 was repeated with the same silica-alumina, except containing no $TiF_4$. After being calcined at 350° C. and 600° C. respectively, it yielded an activity of only 3 and 32 grams of polymer per gram of silica-alumina per hour activity indicating that the $TiF_4$ is necessary for higher activity.

Control Examples 29–31

Fluorided Silica-Alumina

Finally in examples 29, 30, and 31, other fluoriding agents were also impregnated onto the silica-alumina for comparison. In example 29, 1.75 millimoles of ammonium bifluoride were impregnated per gram of silica-alumina, followed by calcining at 500° C. In example 30, 1.0 millimole of ammonium hexafluorosilicate per gram of silica-alumina was impregnated followed by calcining at 450° C. In example 31, 1.60 millimoles of ammonium fluoroborate per gram of silica-alumina were impregnated followed by calcining at 450° C. Although these three treatments succeeded in producing good activity, the shear ratio was unfortunately narrow (lower) in each case, as shown in Table 2.

TABLE 1

| Example | Test Compound | Method of TiF₄ Deposition | Solid Oxide Compound Precalcining | Final Calcination | Organometal Compound | Test Compound (g) | Polymer (g) | Run minutes | Activity* g/g/h |
|---|---|---|---|---|---|---|---|---|---|
| 1 | TiF₄ | None | None | none | Yes | 0.1397 | 16 | 110.0 | 62 |
| 2 | Control -- No Solid | None | | | Yes | 0.0000 | 0 | 61.1 | 0 |
| 3 | TiF₄ on Silica | Sublimation | 400C | 400C | Yes | 0.2531 | 14 | 91.5 | 36 |
| 4 | Control - Silica | None | None | 600C | Yes | 0.5686 | 0.1 | 63.0 | 0 |
| 5 | TiF₄ on Alumina | Impregnated from CH₃CN solution | 600C | 200C | Yes | 0.1663 | 13 | 60.0 | 78 |
| 6 | TiF₄ on Alumina | Impregnated from CH₃CN solution | 600C | 300C | Yes | 0.0883 | 7 | 70.0 | 68 |
| 7 | Control - Alumina | None | None | 400C | Yes | 0.8475 | trace | 57.2 | 0 |
| 8 | Control - Alumina | None | None | 600C | Yes | 1.1219 | 21.5 | 104.5 | 11 |
| 9 | Control - Alumina | None | None | 800C | Yes | 0.6948 | 2.7 | 30.7 | 8 |
| 10 | TiF₄ on Silica | Decomposition of 0.5 mmol/g (NH₄)₂TiF₆ | None | 250C | Yes | 0.3640 | 55 | 58.0 | 156 |
| 11 | TiF₄ on Silica | Decomposition of 0.5 mmol/g (NH₄)₂TiF₆ | None | 350C | Yes | 0.0379 | 3 | 60.0 | 79 |
| 12 | TiF₄ on Silica | Decomposition of 0.5 mmol/g (NH₄)₂TiF₆ | None | 400C | Yes | 0.2609 | 40.5 | 60.0 | 155 |
| 13 | TiF₄ on Silica | Decomposition of 2.0 mmol/g (NH₄)₂TiF₆ | None | 250C | Yes | 0.4312 | 46 | 60.0 | 107 |
| 14 | TiF₄ on Silica | Decomposition of 2.0 mmol/g (NH₄)₂TiF₆ | None | 350C | Yes | 0.2142 | 1 | 60.0 | 5 |
| 15 | TiF₄ on Silica | Decomposition of 2.0 mmol/g (NH₄)₂TiF₆ | None | 450C | Yes | 0.0961 | 3 | 35.0 | 54 |
| 16 | TiF₄ on Silica | Decomposition of 2.0 mmol/g (NH₄)₂TiF₆ | None | 550C | Yes | 0.0998 | 7 | 30.0 | 140 |
| 17 | ZrF₄ on Silica | Decomposition of 0.4 mmol/g (NH₄)₂ZrF₆ | None | 250C | Yes | 0.4025 | 210 | 47 | 666 |
| 18 | ZrF₄ on Silica | Decomposition of 0.4 mmol/g (NH₄)₂ZrF₆ | None | 350C | Yes | 0.0920 | 17 | 65.8 | 168 |
| 19 | ZrF₄ on Silica | Decomposition of 0.4 mmol/g (NH₄)₂ZrF₆ | None | 400C | Yes | 0.1980 | 23 | 91.0 | 77 |
| 20 | ZrF₄ on Silica | Decomposition of 1.9 mmol/g (NH₄)₂ZrF₆ | None | 250C | Yes | 0.7456 | 176 | 60 | 236 |
| 21 | ZrF₄ on Silica | Decomposition of 1.9 mmol/g (NH₄)₂ZrF₆ | None | 350C | Yes | 0.1715 | 9 | 30 | 105 |
| 22 | ZrF₄ on Silica | Decomposition of 1.9 mmol/g (NH₄)₂ZrF₆ | None | 450C | Yes | 0.6411 | 139 | 60 | 217 |
| 23 | ZrF₄ on Silica | Decomposition of 1.9 mmol/g (NH₄)₂ZrF₆ | None | 550C | Yes | 0.6909 | 133 | 60 | 193 |

*Activity: (grams of polymer/grams of test compound)/hr

TABLE 2

| Example | Test Compound | Method of TiF₄ Deposition | Solid Oxide Compound Precalcining | Final Calcination | Organometal Compound | Test Compound (g) | Polymer (g) | Run minutes | Activity* g/g/h | MI (g/10 min) | HLMI (g/10 min) | HLMI/MI |
|---|---|---|---|---|---|---|---|---|---|---|---|---|
| 24 | TiF₄ on Silica-Alumina | Sublimation | 500C | 500C | Yes | 0.0135 | 110 | 60.0 | 8148 | 0.116 | 2.8 | 24.2 |
| 25 | TiF₄ on Silica-Alumina | Sublimation | 500C | 500C | Yes | 0.1902 | 39 | 1.5 | 8202 | | | |
| 26 | TiF₄ on Silica-Alumina | Sublimation | 500C | 500C | No | 0.0858 | 3 | 31.4 | 67 | 0 | 0 | |
| 27 | Control -- Silica-alumina | None | None | 350C | Yes | 0.3102 | 1.1 | 83.5 | 3 | | | |
| 28 | Control -- Silica-alumina | None | None | 700C | Yes | 0.3912 | 8.3 | 40.0 | 32 | | | |
| 29 | Control -- F-Silica-Alumina | None (NH₄HF₂) | None | 500C | Yes | 0.0569 | 273 | 60.0 | 4798 | 0.22 | 3.89 | 17.6 |
| 30 | Control -- F-Silica-Alumina | None (NH₄)₂SiF₆ | None | 450C | Yes | 0.1309 | 338 | 30.0 | 5164 | 0.24 | 4.43 | 18.5 |
| 31 | Control -- F-Silica-Alumina | None (NH₄BF₄) | None | 450C | Yes | 0.1368 | 291 | 30.0 | 4254 | 0.25 | 4.10 | 16.4 |

*Activity - (grams of polymer/grams of test compound)/hour

While this invention has been described in detail for the purpose of illustration, it is not intended to be limited thereby but is intended to cover all changes and modifications within the spirit and scope thereof.

That which is claimed is:

1. A process to produce a catalyst composition, said process comprising contacting at least one organometal compound, at least one organoaluminum compound, and at least one solid to produce a catalyst substantially free of aluminoxane compounds and fluoro organic borate compounds, wherein said organometal compound has the following general formula:

$$(X^1)(X^2)(X^3)(X^4)M^1$$

wherein $M^1$ is selected from the group consisting of titanium, zirconium, and hafnium;

wherein $(X^1)$ is selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of $(X^1)$ are selected from the group consisting of aliphatic groups, cyclic groups, combinations of aliphatic and cyclic groups, silyl groups, alkyl halide groups, halides, organometallic groups, phosphorus groups, nitrogen groups, boron groups, germanium groups, and hydrogen;

wherein at least one substituent on $(X^1)$ can be a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein $(X^2)$ is selected from the group consisting of cyclopentadienyls, indenyls, fluorenyls, substituted cyclopentadienyls, substituted indenyls, substituted fluorenyls, halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups;

wherein substituents on $(X^2)$ are selected from the group consisting of aliphatic groups, cyclic groups, combinations of aliphatic groups and cyclic groups, silyl groups, alkyl halide groups, halides, organometallic groups, phosphorus groups, nitrogen groups, boron groups, germanium groups, and hydrogen;

wherein at least one substituent on $(X^2)$ can be a bridging group which connects $(X^1)$ and $(X^2)$;

wherein said organoaluminum compound has the following general formula:

$$Al(X^5)_n(X^6)_{3-n}$$

wherein $(X^5)$ is a hydrocarbyl having from 1 to about 20 carbon atoms;

wherein $(X^6)$ is a halide, hydride, or alkoxide; and wherein "n" is a number from 1 to 3 inclusive;

wherein said solid is selected from the group consisting of titanium tetrafluoride, zirconium tetrafluoride, and a treated solid oxide compound;

wherein said treated solid oxide compound comprises a solid oxide compound having titanium tetrafluoride or zirconium tetrafluoride deposited on the surface of said solid oxide compound; and wherein said solid oxide comprises oxygen and at least one element selected from the group consisting of groups 2–9 and 11–17 of the Periodic Table of Elements, including lanthanides and actinides.

2. A process according to claim 1 wherein said treated solid oxide compound is produced by a process comprising:

1) calcining said solid oxide compound to produce a calcined solid oxide compound;

2) dissolving titanium tetrafluoride or zirconium tetrafluoride is dissolved in any aprotic polar solvent to produce a metal fluoride solution;

3) contacting said metal fluoride solution with said calcined solid oxide compound to produce a metal fluoride/solid oxide compound mixture;

4) evaporating said aprotic polar solvent from said metal fluoride/solid oxide compound mixture to produce said treated solid oxide compound; and 5) optionally, drying said treated solid oxide compound to remove substantially all of said aprotic polar solvent.

3. A process according to claim 1 wherein said treated solid oxide compound is produced by a process comprising:

(1) calcining a solid oxide compound to produce a calcined solid oxide compound;

(2) dry mixing said calcined solid oxide compound and titanium tetrafluoride to produce a titanium tetrafluoride/solid oxide compound mixture; and (3) calcining said titanium tetrafluoride/solid oxide compound mixture at a temperature in a range of about 250° C. to about 500° C. for about 1 minute to about 10 hours to produce said treated solid oxide compound.

4. A process according to claim 1 wherein said treated solid oxide a compound is produced by a process comprising:

1) impregnating a solid oxide compound with a solution comprising ammonium hexafluorotitanate ($(NH_4)_2TiF_6$) or ammonium hexafluorozirconate ($(NH_4)_2ZrF_6$) and a solvent to produce an ammonium metal fluoride-containing solid oxide compound;

2) evaporating said solvent from said ammonium metal fluoride-containing solid oxide compound; and 3) calcining said ammonium metal fluoride-containing solid oxide compound at sufficiently high temperature to decompose said ammonium hexafluorotitanate or ammonium hexafluorozirconate to titanium tetrafluoride or zirconium tetrafluoride, thereby, releasing ammonium fluoride ($NH_4F$) in the process to produce said treated solid oxide compound.

5. A catalyst composition produced by the process of claim 1.

6. A catalyst composition according to claim 5 wherein said catalyst composition has an activity greater than 50 grams of polymer per gram of solid per hour under slurry polymerization conditions, using isobutane as a diluent, with a polymerization temperature of 90° C., and an ethylene pressure of 550 psig.

7. A catalyst composition according to claim 6 wherein said catalyst composition has an activity greater than 100 grams of polymer per gram of solid per hour under slurry polymerization conditions, using isobutane as a diluent, with a polymerization temperature of 90° C., and an ethylene pressure of 550 psig.

8. A catalyst composition according to claim 5 wherein a weight ratio of said organoaluminum compound to said solid in said catalyst composition ranges from 3:1 to 1:100.

9. A catalyst composition according to claim 8 wherein said weight ratio of said organoaluminum compound to said solid in said catalyst composition ranges from 1:1 to 1:50.

10. A catalyst composition according to claim 5 wherein a weight ratio of said solid to said organometal compound in said catalyst composition ranges from about 1000:1 to about 10:1.

11. A catalyst composition according to claim 10 wherein said weight ratio of said solid to said organometal compound in said catalyst composition ranges from 250:1 to 20:1.

12. A process to produce a catalyst composition, said process consisting essentially of:
 (1) calcining silica-alumina at a temperature in a range of about 300 to about 700° C. for about 1 hour to about 50 hours to produce a calcined silica-alumina;
 (2) cooling said calcined silica-alumina and mixing sufficient titanium tetrafluoride to yield about 0.1 to about 5 millimoles of titanium tetrafluoride per gram of calcined silica-alumina to produce a titanium tetrafluoride-containing silica-alumina; and
 (3) calcining the titanium tetrafluoride-containing silica-alumina at a temperature in a range of about 300 to about 500° C. for about 1 hour to about 5 hours to produce a treated solid oxide compound; and
 (4) contacting a organometal compound, organoaluminum compound, and the treated solid oxide compound to produce the catalyst composition.

13. A process to produce a catalyst composition, said process consisting essentially of:
 (1) calcining silica-alumina in dry nitrogen at 500° C. for about 3 hours to produce a calcined silica-alumina;
 (2) cooling said calcined silica-alumina and mixing sufficient titanium tetrafluoride to yield 0.5 to 3 millimoles of titanium tetrafluoride per gram of calcined silica-alumina to produce a titanium tetrafluoride-containing silica-alumina; and
 (3) calcining the titanium tetrafluoride-containing silica-alumina at 500° C. for about 1 hour to produce a treated solid oxide compound; and
 (4) contacting bis(n-butylcyclopentadienyl)zirconium dichloride, triethylaluminum, and said treated solid oxide compound to produce the catalyst composition.

* * * * *